(12) United States Patent
Kanoh et al.

(10) Patent No.: US 6,181,396 B1
(45) Date of Patent: *Jan. 30, 2001

(54) IRREGULARLY CORRUGATED REFLECTIVE PLATE FOR A LIQUID CRYSTAL DISPLAY

(75) Inventors: Hiroshi Kanoh; Eishi Mizobata, both of Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/579,344

(22) Filed: Dec. 27, 1995

(30) Foreign Application Priority Data

Dec. 28, 1994 (JP) .................................... 6-341125

(51) Int. Cl.[7] .......................... G02F 1/135; G02F 1/136; G02F 1/1335; G02F 1/1333

(52) U.S. Cl. ........................ 349/113; 349/49; 349/51; 349/100; 349/110; 349/69; 205/477; 420/124

(58) Field of Search ............................ 349/113, 100, 349/110, 49, 51, 69; 420/124; 205/477

(56) References Cited

U.S. PATENT DOCUMENTS

| | | | | |
|---|---|---|---|---|
| 4,106,859 | * | 8/1978 | Doriguzzi et al. | 349/113 |
| 4,431,272 | * | 2/1984 | Yazawa et al. | 350/336 |
| 4,519,678 | * | 5/1985 | Komatsubara et al. | 349/160 |
| 5,204,765 | * | 4/1993 | Mitsui et al. | 349/113 |
| 5,408,345 | * | 4/1995 | Mitsui et al. | 349/42 |
| 5,500,750 | * | 3/1996 | Kanbe et al. | 349/42 |
| 5,526,149 | * | 6/1996 | Kanbe et al. | 349/113 |
| 5,610,741 | * | 3/1997 | Kimura | 349/113 |
| 5,619,356 | * | 4/1997 | Kozo et al. | 349/99 |
| 5,663,020 | * | 9/1997 | Yamaue et al. | 349/49 |
| 5,734,455 | * | 3/1998 | Yoshida et al. | 349/99 |
| 5,805,252 | * | 9/1998 | Shimada et al. | 349/113 |

FOREIGN PATENT DOCUMENTS

| | | |
|---|---|---|
| 61-6390 | * 2/1986 | (JP) . |
| 6-27481 | * 2/1994 | (JP) . |
| 6-75237 | * 3/1994 | (JP) . |
| 9-175126 | * 6/1994 | (JP) . |

OTHER PUBLICATIONS

K. Tadokoro et al., "Reflective Multicolor LCD (1): Consideration of the Color Purity and Brightness", *Proceedings of the SID*, vol. 29/2, 1988, pp. 151–160.*

* cited by examiner

Primary Examiner—William L. Sikes
Assistant Examiner—Julie Ngo
(74) Attorney, Agent, or Firm—Young & Thompson

(57) ABSTRACT

A reflective liquid crystal display apparatus reflective plate includes embodiments with a full-width at half maximum value in a distribution graph of distances between adjacent projecting or recessed portions with an average of the distances between the adjacent projecting or recessed portions within 0.3 to 0.9; an average of distances between adjacent projecting or recessed portions within 1 μm to 80 μm; a full-width at half maximum value in a distribution graph of heights of projecting or recessed portions with an average of the heights falling within 0.2 to 0.9; a maximum height of corrugations on a surface of the reflective plate within 0.1 μm to 5 μm; and a region having a horizontal inclination angle of 0° occupying 20% or less of an entire region inside the surface of the pixel electrode and also with an average inclination angle of corrugations in the entire region is 50 to 10° in all azimuths on the pixel electrode as the reflective plate.

6 Claims, 8 Drawing Sheets

IRREGULARLY CORRUGATED REFLECTIVE PLATE FOR A LIQUID CRYSTAL DISPLAY

BACKGROUND OF THE INVENTION

1. Field of the Invention

The present invention relates to a reflective liquid crystal display apparatus and, more particularly, to an improvement in a reflective plate of a reflective liquid crystal display apparatus.

2. Description of the Prior Art

A reflective liquid crystal display apparatus does not require a back light as a light source because light obtained by reflecting external incident light by a reflective plate positioned inside the liquid crystal display apparatus is used as a display light source. This apparatus is considered to be an effective system for achieving a decrease in power consumption, a decrease in thickness, and a light weight, compared to a transparent liquid crystal display apparatus. The basic structure of a conventional reflective liquid crystal display apparatus comprises a liquid crystal of a TN (Twisted Nematic) scheme, an STN (Super Twisted Nematic) scheme, a GH (Guest Host) scheme, a PDLC (macromolecular dispersion) scheme, or the like, elements (e.g., thin film transistors or diodes) for switching the liquid crystal, and a reflective plate arranged on the inner or outer side of the elements.

The display performance of the reflective liquid crystal display apparatus is required to provide a bright, white display in a liquid crystal transmissive state. To realize this display performance, it is important to control the reflective properties of the reflective plate.

The surface of a conventional reflective plate is corrugated to reflect light incident at all angles by a reflective surface in a target direction (display direction).

Well-known corrugation shapes on the surfaces of reflective plates are as follows.

① The pitch of corrugations falls within a range of 1 $\mu$m to 100 $\mu$m, the corrugation height falls within a range of 0.1 $\mu$m to 10 $\mu$m, the corrugation inclination angle is 0° to 30° with respect to the horizontal surface of a substrate, and intervals between the projecting portions of the corrugations are irregular (disclosed in Japanese Examined Patent Publication No. 61-6390).

② The corrugation height exhibits the Gaussian distribution, and the average inclination angle of corrugations at this time is 10° (disclosed in Tohru Koizumi and Tatsuo Uchida, Proceedings of the SID, Vol. 29, 157, 1988).

③ The surface of a reflective electrode has a plurality of projecting portions arrayed irregularly (disclosed in Japanese Unexamined Patent Publication No. 6-75237).

④ The surface of a reflective plate is a smooth corrugated surface, and the average inclination angle of corrugations is selected from 4° to 15° (disclosed in Japanese Unexamined Patent Publication No. 6-175126).

⑤ At least two or more projecting portions having different heights are formed on the surface of a reflective plate (disclosed in Japanese Unexamined Patent Publication No. 6-27481).

A conventional method of corrugating a reflective plate uses photolithography and etching which are performed to an organic film to uniformly corrugate a large-area substrate without causing any damage. To obtain a reflective plate having desired reflective properties, a corrugation shape on the surface of the reflective plate must be optimally designed.

In the above references of the reflective liquid crystal display apparatuses, the average inclination angle of corrugations is designated to optimize a corrugation shape. As for practical reflective performance, however, a flat region is included in the corrugation shape on the entire surface of the reflective plate, or corrugated surfaces having various inclination angles except for the inclination angle designated in the reference are present on the entire surface of the reflective plate. For this reason, it is difficult to obtain a bright reflective liquid crystal display apparatus having a reflective plate by designating only the average inclination angle described in the references.

In the above references, the surface of the reflective plate is irregularly corrugated. However, these references are insufficient for defining a corrugated structure on the surface of the reflective plate having optimum reflective performance because designation of a detailed irregular shape is indefinite, and irregularity from a regular structure is not defined.

SUMMARY OF THE INVENTION

The present invention has been made in consideration of the above situation in the conventional techniques, and has as its object to provide a reflective liquid crystal display apparatus with a reflective plate having a corrugated structure which is required for obtaining optimum reflective properties.

To achieve the above object, according to the present invention, there is provided a reflective liquid crystal display apparatus having a structure in which a liquid crystal layer is sandwiched between an insulating substrate having a corrugated reflective plate as a pixel electrode and an insulating substrate having a transparent electrode, wherein the reflective plate is a reflective plate having an irregularly corrugated structure and satisfies any one of ① to ⑥ in order to obtain a reflective plate having excellent scattering performance. That is, ① a value obtained by standardizing a full-width at half maximum in a distribution graph of distances between adjacent projecting or recessed portions with an average of the distances between the adjacent projecting or recessed portions falls within a range of 0.3 to 0.9;

② an average of distances between adjacent projecting or recessed portions falls within a range of 1 $\mu$m to 80 $\mu$m;

③ a value obtained by standardizing a full-width at half maximum in a distribution graph of heights of projecting or recessed portions with an average of the heights is 0.2 or more;

④ a maximum height of corrugations on a surface of the reflective plate falls within a range of 0.1 $\mu$m to 5 $\mu$m;

⑤ a region having an inclination angle of 0° with respect to a horizontal surface of the insulating substrate inside a surface of the pixel electrode as the reflective plate occupies 20% or less of an entire region inside the surface of the pixel electrode, and an average inclination angle of corrugations in the entire surface is 5° to 10° in all azimuths on the pixel electrode as the reflective plate; and ⑥ the reflective plate which satisfies at least one of the conditions described in ① to ⑤ has six or more projecting or recessed portions inside the surface of the pixel electrode.

According to the present invention, a corrugated reflective plate can be formed which is rarely affected by the use environment or can most efficiently utilize incident light for reflected light when the use environment is set.

With this reflective plate, a bright, high-quality reflective liquid crystal display apparatus can be provided. In addition, this reflective plate can be applied to not only a liquid crystal display apparatus but also various display apparatuses and the like.

The above and other advantages, features and additional objects of the present invention will become manifest to those versed in the art upon making reference to the following detailed description and accompanying drawings in which preferred structural embodiments incorporating the principle of the present invention are shown by way of illustrative example.

DETAILED DESCRIPTION OF PREFERRED EMBODIMENTS

Figure 1:
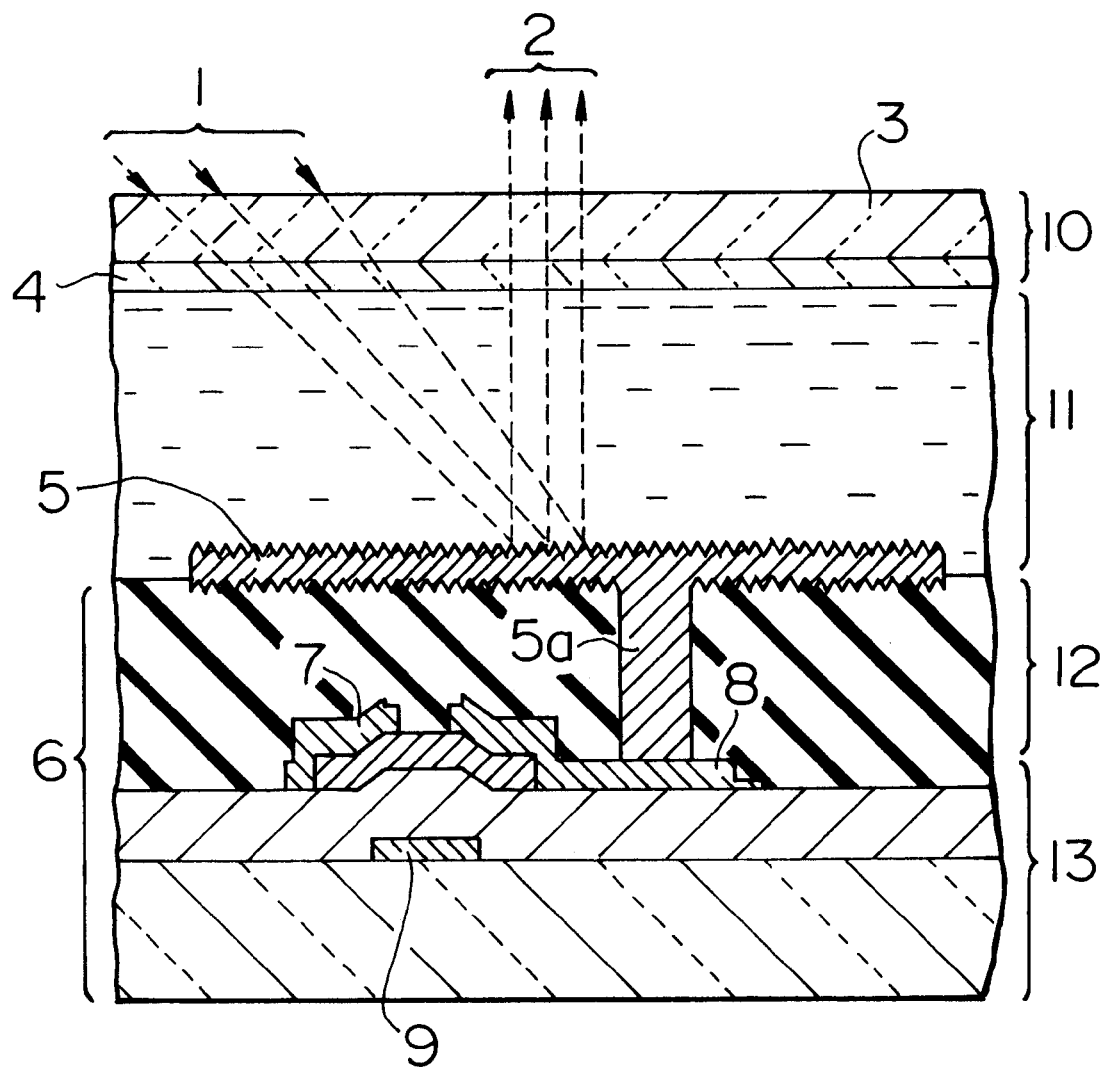
FIG. 1 is a sectional view showing the structure of a reflective liquid crystal display apparatus according to the present invention.

The present invention will be described in detail below. FIG. 1 is a sectional view showing the structure of a reflective liquid crystal display apparatus used in the present invention. According to the present invention, the reflective liquid crystal display apparatus has a structure in which a corrugated reflective plate 5 is defined as a pixel electrode, and a liquid crystal layer 11 is sandwiched between insulating substrates 13 and 10. The insulating substrate 13 has a switching element (e.g., a transistor) 6 connected to the reflective pixel electrode 5 to perform active-matrix driving. The insulating substrate 10 opposes the insulating substrate 13 and has a transparent electrode 3. On the insulating substrate 13 having the switching element and the reflective plate 5, this reflective plate 5 is obtained by forming a corrugated organic insulating layer 12 on the upper portion of the substrate 13 having the switching element 6 and a wiring portion, and covering the corrugated upper portion with a highly efficient reflective layer.

Figure 2A:
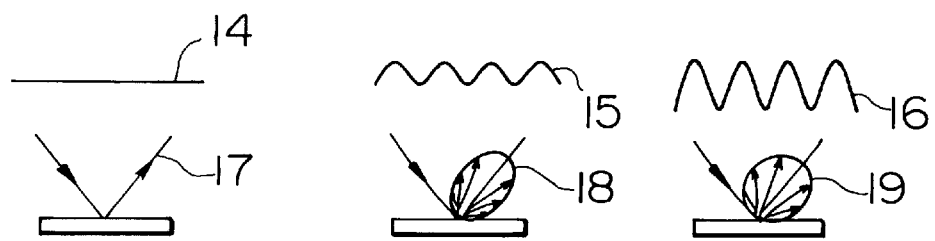
FIGS. 2A and 2B are views showing the relationships between the inclination angles and structure irregularity of corrugations on the surface of a reflective plate, and reflected states.

The inclination angle of corrugations on the surface of the reflective plate is changed to change the reflective properties of the reflective plate 5. FIG. 2A shows views for explaining corrugations on the surface of the reflective plate and the scattering properties of reflected light. In the case of a mirror surface having no corrugation on the surface of the reflective plate, light is reflected in the specular reflection direction of incident light. As the corrugation inclination angle increases (14→15→16), the reflected light spreads to increase the scattering properties (17→18→19). In particular, by setting the corrugation inclination angle at 5° to 10°, a reflective plate having directivity suitable for a reflective liquid crystal display apparatus can be obtained. A brighter display performance can be obtained.

Figure 2B:
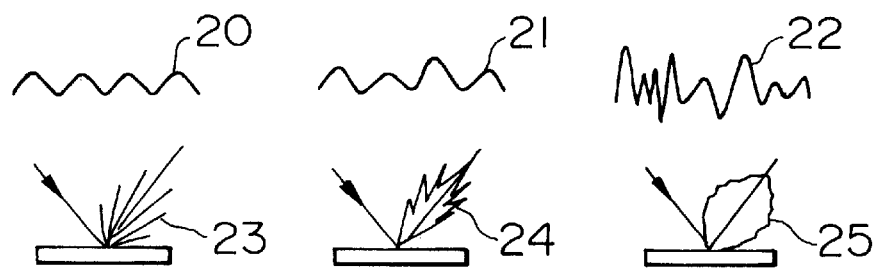

On the other hand, when the corrugated structure and corrugation shape of the reflective plate become irregular from a periodical structure and the same shape, the reflective properties of the reflective plate change from properties exhibiting coherence to properties exhibiting incoherence. FIG. 2B shows views for explaining the irregularity of corrugations on the surface of the reflective plate and the coherence of reflected light. When the corrugations on the surface of the reflective plate have the same shape to form a regular structure, the reflective properties exhibit a coherence phenomenon 23 having a peak. As the corrugation shape and structure become irregular (20→21→22), the peak of the coherence phenomenon decreases (indicated by reference numeral 24) and disappears (indicated by reference numeral 25). The optimum conditions for the corrugation inclination angle and the irregular structure which determine the reflective properties will be described below.

Figure 3:
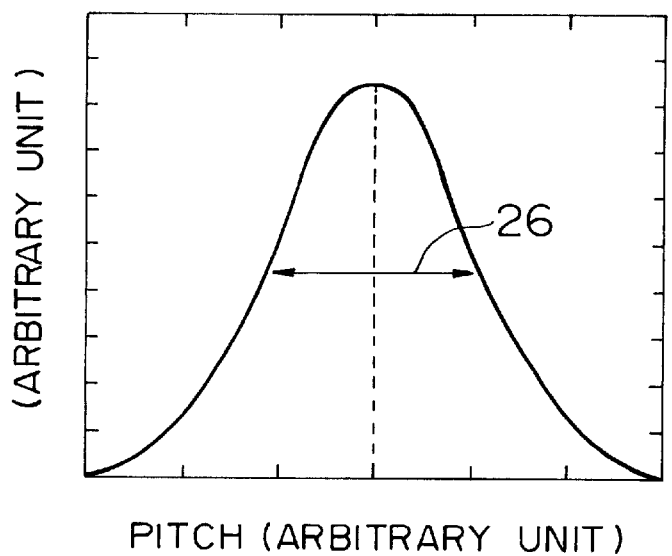
FIG. 3 is a graph for explaining the distribution of the distances between adjacent recessed (or projecting) portions, and the degree of freedom of pitch.
Figure 4:
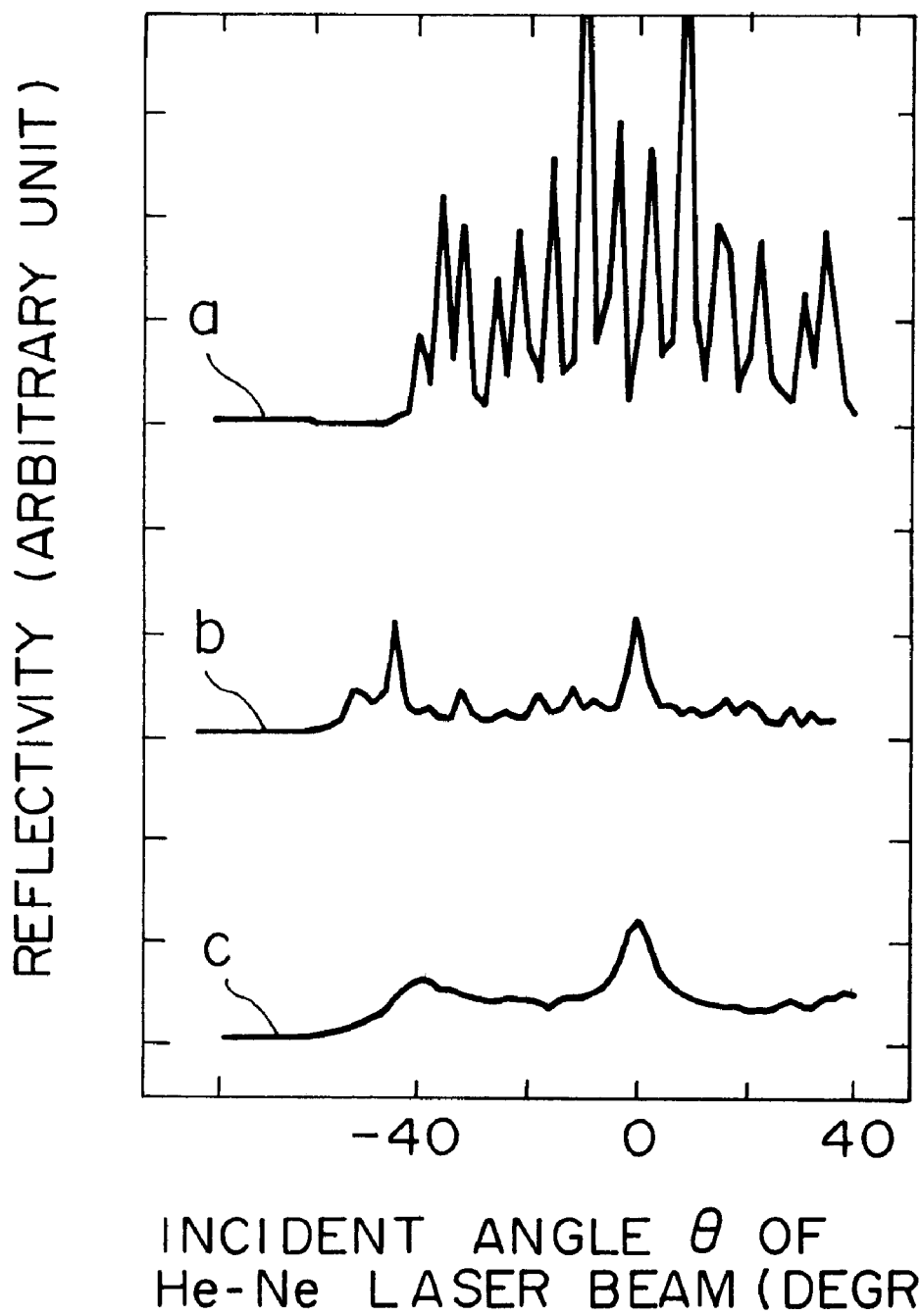
FIG. 4 is a graph showing the dependency of reflective properties on the degree of freedom of pitch.

FIG. 3 shows the distribution of the distances between adjacent recessed or projecting portions on the surface of the reflective plate. Note that the average ($P_{AV}$) of the distances between adjacent recessed (or projecting) portions was set at 5 to 20 μm. A value obtained by standardizing (dividing) a full-width at half maximum 26 ($R_{FWHM}$) in this distribution with the average distance was defined as the variation degree of the positions of recessed (or projecting) portions, i.e., a degree of freedom of pitch Rp ($=R_{FWHM}/R_{AV}$). FIG. 4 shows the reflective performance of an irregular structure changed from a periodically corrugated structure on the surface of the reflective plate upon a change in degree of freedom of pitch. The degrees of freedom of pitch were set at Rp=(a) 0, (b) 0.2, and (c) 0.3 for the reflective performance. In the case of a periodically corrugated structure (a), a peak exhibiting coherence appeared. With an increase in Rp, the peak value of the reflective properties decreased (b), and the coherence phenomenon disappeared (c). Then, continuous reflective performance could be obtained within viewing angles. By setting Rp≧0.3, a reflective plate exhibiting no coherence phenomenon can be obtained. This reflective plate having a corrugated surface indicated by reference numeral 22 in FIG. 2B is applied to a reflective liquid crystal display apparatus to obtain a colorless, high-quality display. Note that the distribution of the distances between adjacent recessed or projecting portions is not limited to the Gaussian distribution described in this embodiment.

Figure 5:
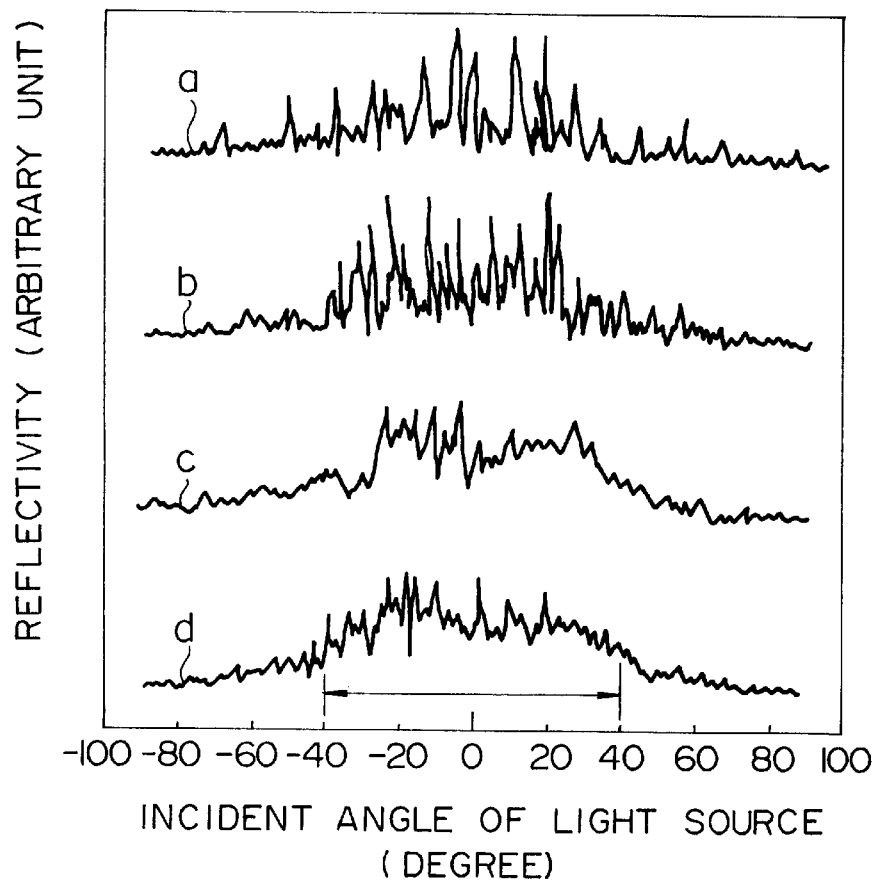
FIG. 5 is a graph showing how reflective properties depend on the average of the distances between adjacent recessed (or projecting) portions.

FIG. 5 shows the relationships between the average ($P_{AV}$) of the distances between adjacent recessed or projecting portions and reflective performance. The reflective performance is checked at $P_{AV}$ (μm)=(a) 500, (b) 200, (c) 100, and (d) 80. Note that Rp=0.6 is constant. In FIG. 5, continuous reflective performance having a high reflection intensity can be obtained at $P_{AV}$≦80 μm within a range of an incident angle of −40° to +40° which greatly contributes to panel display performance. If $P_{AV}$ increases from the above value to c→b→a, the reflection intensity becomes discontinuous, and the average intensity also decreases. As a result, a display becomes dark. By setting the distance between adjacent projecting or recessed portions on the surface of the reflective plate to 80 µm or less, a reflective plate having good reflective performance can be obtained.

Figure 6:
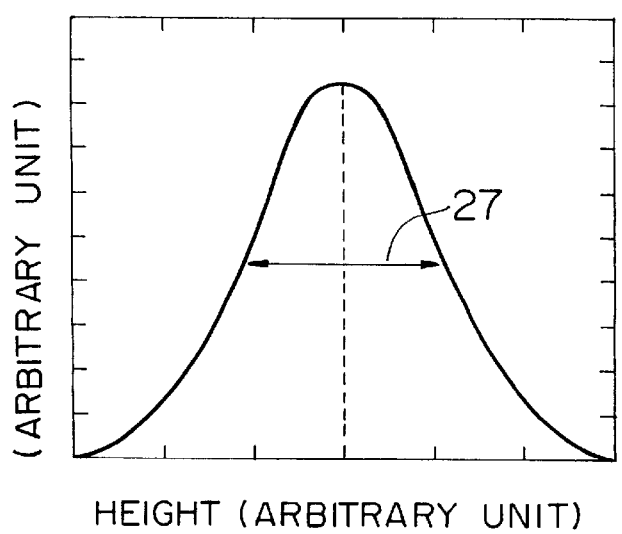
FIG. 6 is a graph for explaining the height distribution of corrugations on the reflective plate, and the degree of freedom of height.
Figure 7:
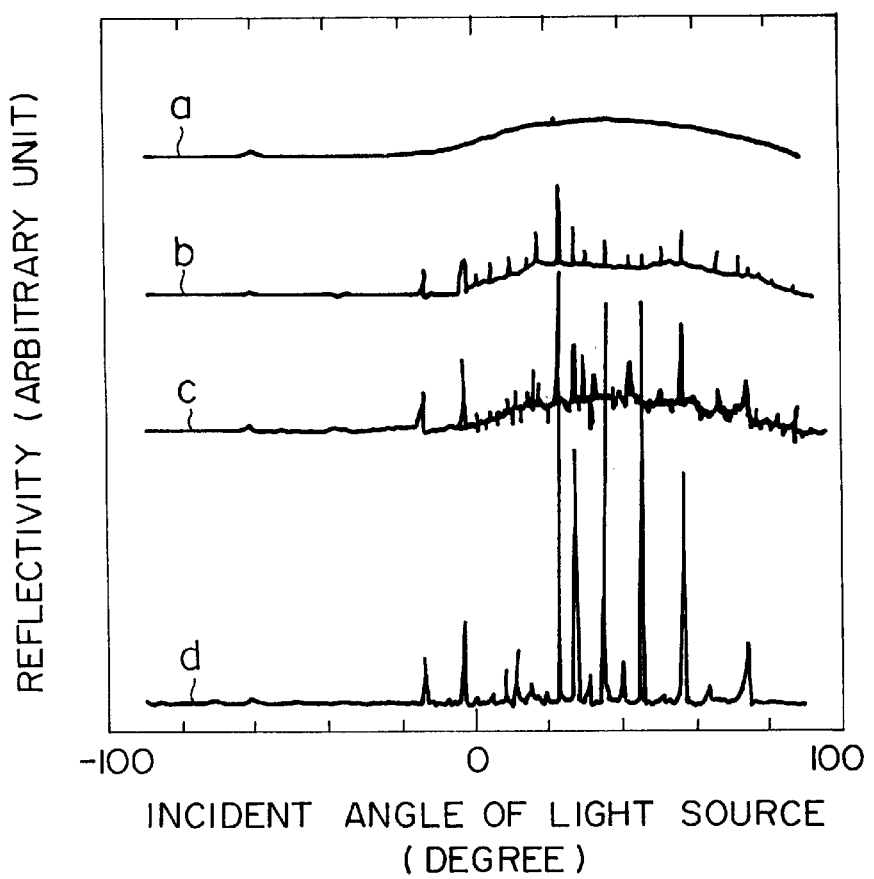
FIG. 7 is a graph showing the dependency of reflective properties on the degree of freedom of height.

FIG. 6 shows the height distribution of corrugations on the surface of the reflective plate. A value obtained by standardizing a full-width at half maximum 27 ($F_{FWHM}$) in the height distribution graph with the corrugation height average ($H_{av}$) is defined as a degree of freedom of height Rh (=$H_{FWHM}/H_{av}$). FIG. 7 shows reflective performance at Rh=(a) 0.3, (b) 0.2, (c) 0.1, and (d) 0. By setting the degree of freedom of height to 0.2 or more, the coherence phenomenon disappears, and a colorless reflective plate under a white light can be obtained. Note that the height distribution is not limited to the Gaussian distribution described in this embodiment. In some embodiments to Rh is within a range of 0.2 and 0.9.

Figure 8:
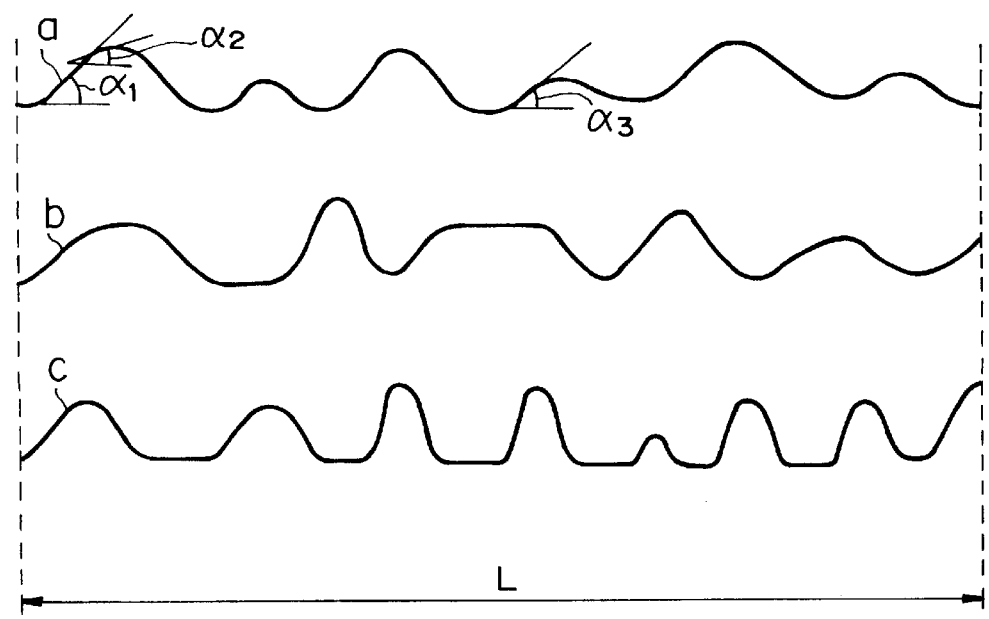
FIG. 8 is a graph for explaining the average inclination angle of corrugations on the reflective plate.
Figure 9:
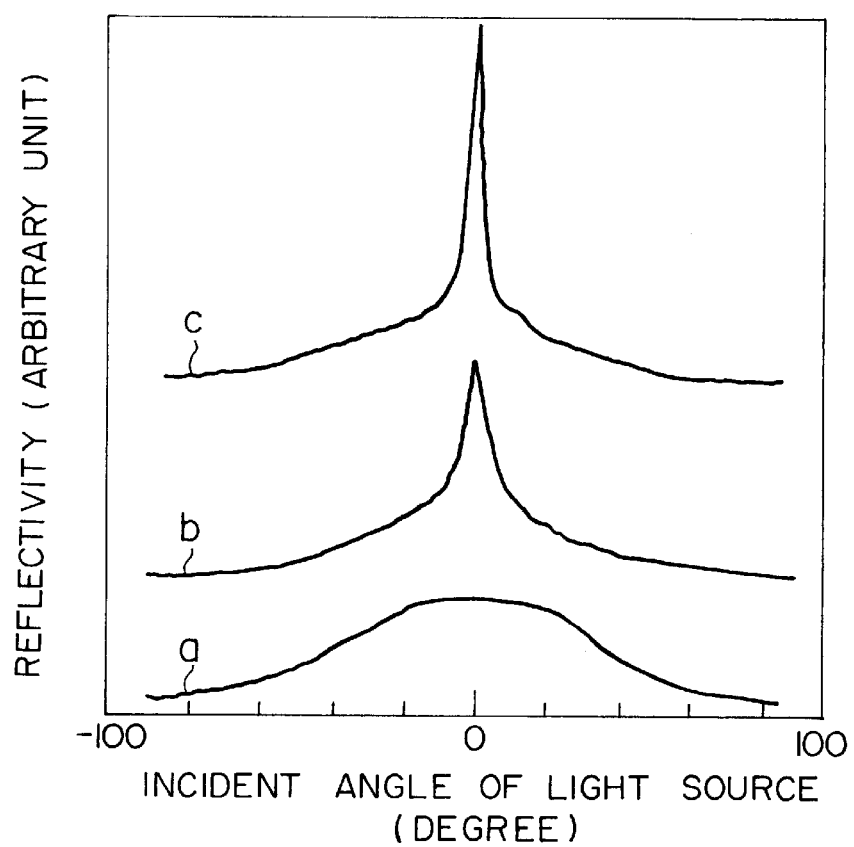
FIG. 9 is a graph showing the dependency of reflective properties on the occupation ratio of a flat region.

FIG. 8 is a view showing the sections of corrugation shapes on the surfaces of the reflective plates to explain the average inclination angles of the reflective plates. To obtain desired reflective performance, an irregularly corrugated structure is required comprising flat regions, identifiable individually as flat subregions, and corrugated subregions, so that the surfaces of the reflective plates have various corrugation shapes. The corrugations of each reflective plate have different inclination angles, i.e., α1, α2, and α3 depending on target inclination angles. For this reason, when the average inclination angle on the surface of the reflected plate in the present invention is defined as K, K is indicated by the mean square of the inclination angles of all small regions in a length L inside a reflective pixel electrode. FIG. 8 shows corrugation sections when the occupation ratios of flat regions inside the pixel electrodes as the reflective plates are different, i.e., (a) 0%, (b) 30%, and (c) 45%. FIG. 9 shows the reflective performance of the reflective plates corresponding to the ratios (a), (b), and (c). When the occupation ratio of all of the flat regions, or the total flat region inside the pixel electrode is high, the specular reflection component of the reflective performance is large, scattering properties become poor even with the same average inclination angle. Since the panel display of this reflective plate is dark, the reflective plate cannot be put into practical use. To the contrary, when the occupation ratio of the flat region is 20%, and the condition of the average inclination angle of the corrugated surface is satisfied, the specular reflection component of the reflective performance is not large.

Figure 10:
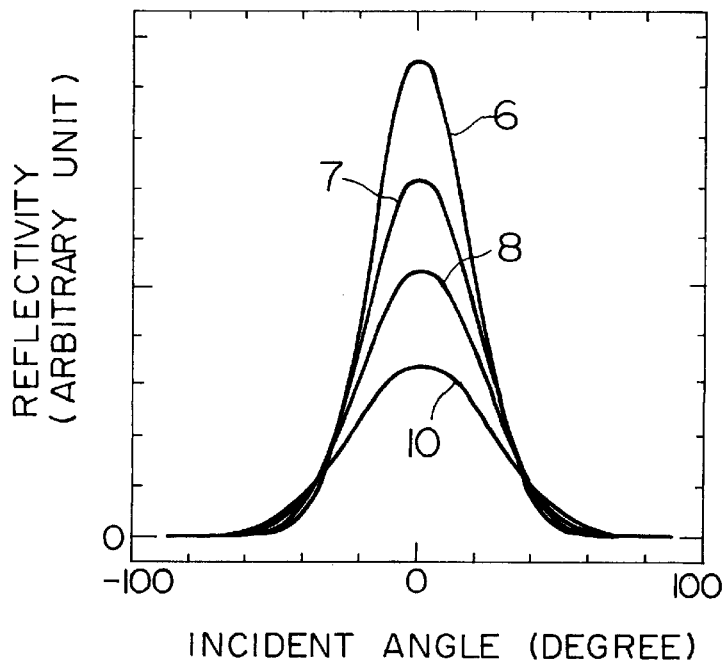
FIG. 10 is a graph showing the dependency of reflective properties on the average inclination angle of corrugations on the surface of the reflective plate.

FIG. 10 shows the relationships between the average inclination angles and reflective performance (reflectivities) on the surface of the reflective plate when the condition of the flat region is satisfied. (Reference numerals in FIG. 10 denote average inclination angles.) The following display performance of a reflective display apparatus is required for practical use. That is, a panel must have a brightness or more of a sheet of newspaper, the viewing angle of this panel having such brightness must be −20° to +20° or more in a direction perpendicular to the panel, and the change ratio of brightness within this viewing angle must be 50% or less. The reflective performance which satisfies the above required display conditions can be realized only by setting the average inclination angle K at 5° to 10°. This reflective plate is employed in a reflective liquid crystal display apparatus to obtain bright, clear, excellent display performance in practical use.

Figure 11:
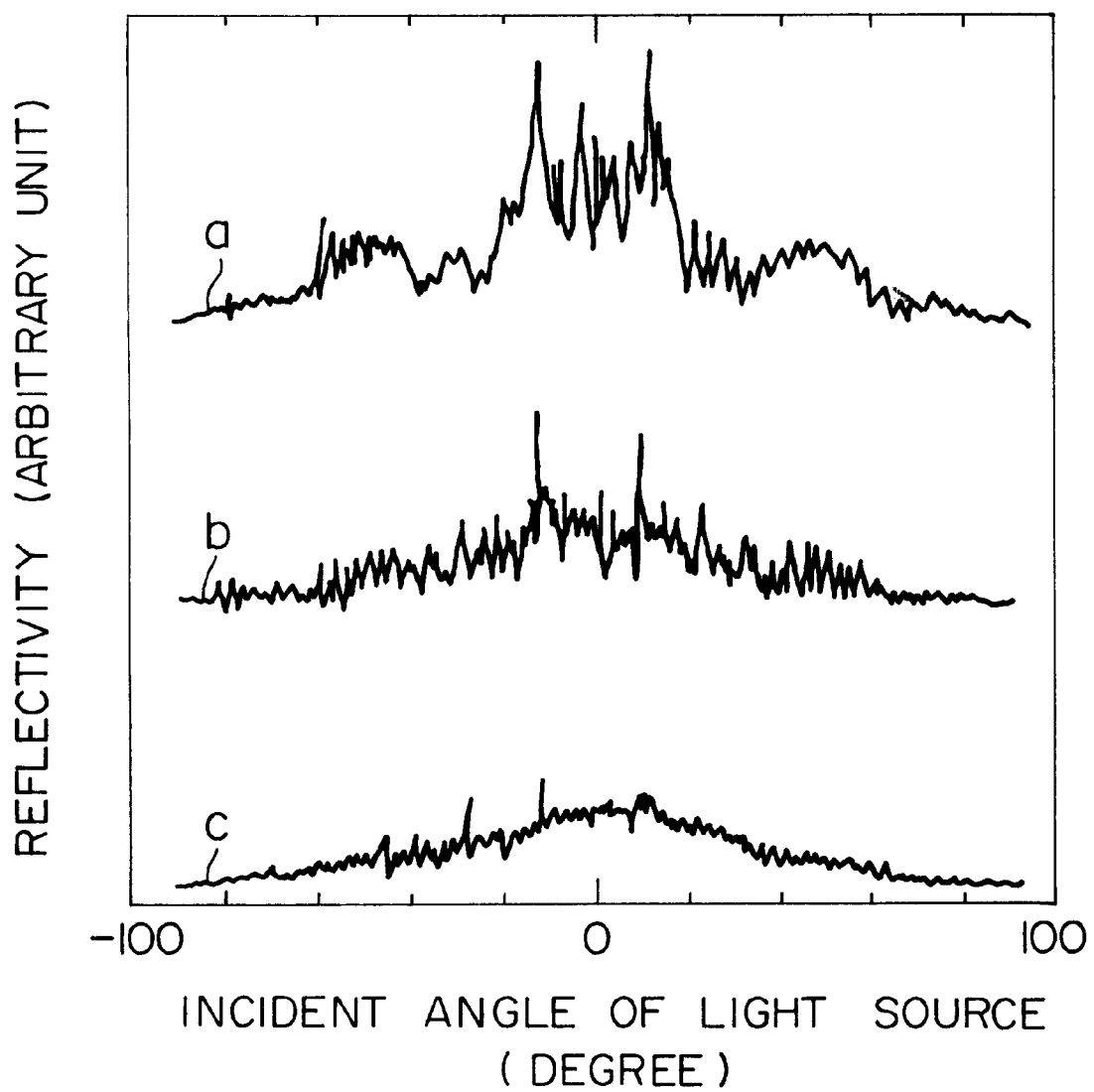
FIG. 11 is a graph showing the dependency of reflective properties on the number of recessed (or projecting) portions.

FIG. 11 shows reflective performance when the numbers of recessed (or projecting) portions having corrugation shapes which satisfy at least one of the above conditions are (a) 4, (b) 6, and (c) 8. It is found that a peak exhibiting coherence decreases with an increase in number of projecting (or recessed) portions to obtain continuous reflective performance having a high reflection intensity within a wide incident angle range.

Embodiments of the present invention will be described below.

Embodiment 1:

A reflective liquid crystal display apparatus used in Embodiment 1 of the present invention had the same structure as that shown in FIG. 1, provided that a pixel pitch is 300 µm. An amorphous silicon thin film transistor (a-SiTFT) 6, a gate signal line 9, and a source signal line 7 are formed on the upper portion of a glass substrate 13 serving as an insulating substrate on a switching side. A reflective plate 5 serving as an aluminum reflective pixel electrode is formed on the upper portion of the resultant structure through a corrugated insulating interlayer 12. At this time, the reflective plate 5 is electrically connected to a drain electrode 8 of the a-SiTFT through a wiring portion 5a and functions as a pixel electrode.

A liquid crystal of a guest host (GH) scheme is employed as a liquid crystal layer 11. An insulating substrate 10 on the opposite side has a transparent electrode 3 and a color filter 4.

In a corrugation forming process, the organic insulating film 12 was formed on the upper portion of the insulating substrate 13, on the switching side, having the switching element 6 and the wiring portion 5a formed thereon. In Embodiment 1, a polyimide film which could be corrugated and sufficiently satisfied the performance of an insulating interlayer was formed as the organic insulating film 12 to a film thickness of 2 to 4 µm. At this time, the film was calcined at 200° or less for 30 minutes. A resist layer was formed on the upper portion. Recessed portion patterns in which the average of the distances between the centers of adjacent recessed portion patterns was 20 µm, and the degree of freedom of pitch was 0.8 were exposed using a chromium mask which allows light to pass through. After the resultant structure was developed and patterned to corrugate the organic film, the resist was removed. With this process, there was provided corrugations in which the average of the distances between the centers of adjacent recessed portion patterns is 25 µm and the degree of freedom of pitch Rp was 0.9. The maximum height of corrugations was 2 µm, the degree of freedom of height Rh was 0.4, the average inclination angle of corrugations was 8°, and the occupation ratio of a region having an inclination angle of 0° inside the pixel electrode was 6%. In addition, about 60 corrugations were present inside the pixel electrode. Thereafter, to form a contact hole, a resist was applied again, and patterning was performed. A hole was formed by dry etching. The etching conditions at this time were an etching gas of oxygen and carbon tetrafluoride, an RF power of 100 to 200 W, and a pressure of 50 to 100 mTorr. After the resist was removed, aluminum was formed to 300 to 500 nm by sputtering. P.R. and etching were performed, and the resist was removed to form the reflective pixel electrode 5. The reflective pixel electrode 5 had a desired corrugation shape in accordance with the corrugation shape of the polyimide underlayer.

Note that, if MFR 305 available from Japan Synthetic Rubber Co., Ltd. or TMR-P3 available from TOKYO OHKA KOGYO CO., LTD. is used for corrugating the organic insulating interlayer 12, the corrugations formed by the above corrugation forming method can melt upon heating at about 170° C. for about 10 minutes, thereby smoothing the corrugation shape.

Figure 12:
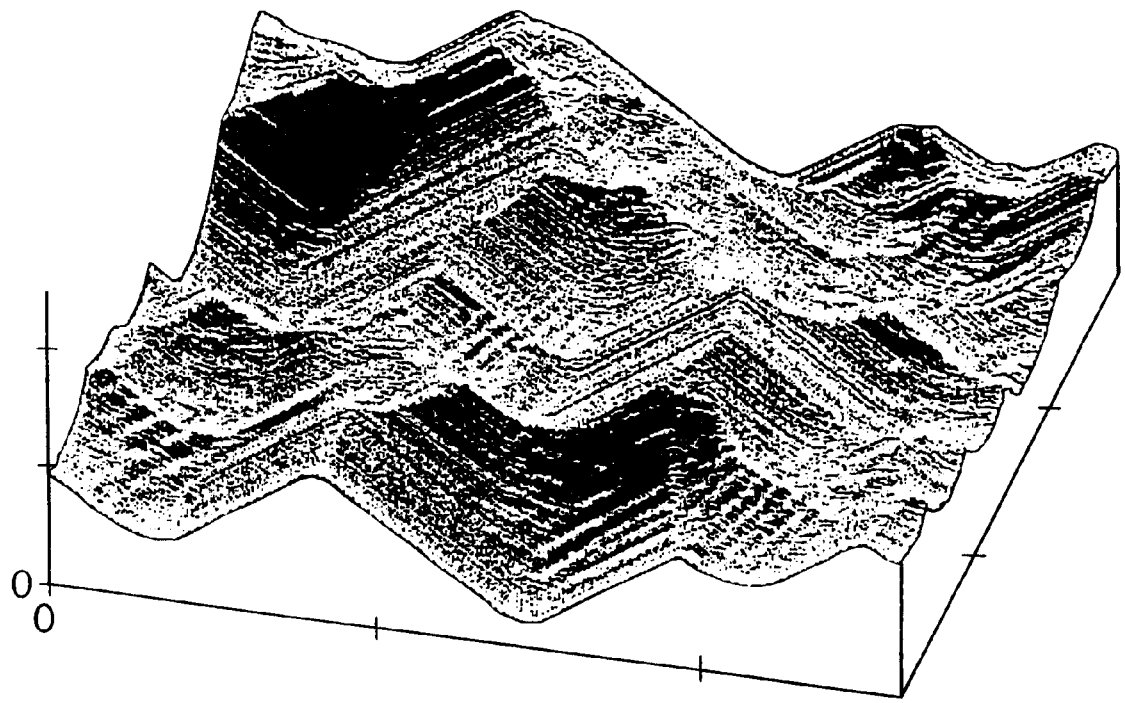
FIG. 12 is a view showing the three-dimensional structure of the surface of the reflective plate.

FIG. 12 shows the three-dimensional surface shape of the reflective plate which is obtained in Embodiment 1 and satisfies the conditions of a value obtained by standardizing a full-width at half maximum in a distribution graph of the distances between adjacent projecting or recessed portions with an average of the distances between said adjacent projecting or recessed portions falls within a range of 0.3 to 0.9. As is apparent from FIG. 12, a reflective plate free from staining caused by coherence can be obtained to realize a reflective liquid crystal display apparatus having an excellent display performance. As shown by FIG. 12, the surface of the reflective plate includes plural irregular elongated ridges and valleys therebetween.

Embodiment 2:

A reflective liquid crystal display apparatus used in Embodiment 2 of the present invention had the same structure as that shown in FIG. 1. The process of forming corrugations on the surface of a reflective plate was the same as that described in Embodiment 1, provided that the variation degree of the positions of recessed (or projecting) portions, i.e., the degree of freedom of pitch Rp was controlled by changing the positions and shapes of mask patterns used for forming corrugations. The degree of freedom of pitch Rp had the Gaussian distribution shape shown in FIG. 3. FIG. 4 shows the reflective performance of a corrugated reflective plate at Rp=(a) 0, (b) 0.2, and (c) 0.3. By setting Rp≧0.3, a reflective plate exhibiting no coherence phenomenon can be obtained. A colorless reflective liquid crystal display apparatus capable of a high-quality display can be realized. Note that the distribution of the distances between adjacent recessed or projecting portions is not limited to the Gaussian distribution described in Embodiment 2. This distance distribution can be freely set to a trapezoid, rectangular, or square distribution by controlling the above mask pattern conditions. Even if corrugation pitches have these distributions, the same effect can be obtained.

Embodiment 3:

A reflective liquid crystal display apparatus used in Embodiment 3 of the present invention had the same structure as that shown in FIG. 1. The process of forming corrugations on the surface of a reflective plate was the same as that described in Embodiment 1, provided that the average ($P_{AV}$) of the distances between adjacent recessed or projecting portions was controlled by changing the shapes of mask patterns used for forming corrugations and the distance between the patterns. In Embodiment 3, corrugations having $P_{AV}$($\mu$m)=(a) 500, (b) 200, (c) 100, and (d) 80 can be obtained on the surface of a reflective surface. The reflective performance of the reflective plate is the same as that shown in FIG. 5. With $P_{AV}$≦80 $\mu$m, continuous reflective characteristics having a high reflection intensity can be obtained within a range of an incident angle of −40° to +40° which greatly contributes to panel display performance, compared to the reflective performance shown in FIG. 5.

The reflective plate which is obtained in Embodiment 3 and satisfies the condition of an average of the distances between adjacent projecting or recessed portions falls within the range of 1 $\mu$m to 80 $\mu$m, can efficiently guide reflected light in front of a panel with respect to incident light from a wide incident angle range. There is provided a reflective liquid crystal display apparatus which has a bright display performance and no wavelength dependency, and comprises the reflective plate having an excellent display performance free from staining caused by coherence.

Embodiment 4:

A reflective liquid crystal display apparatus used in Embodiment 4 of the present invention had the same structure as that shown in FIG. 1. The process of forming corrugations on the surface of a reflective plate was the same as that described in Embodiment 1, provided that the heights of corrugation portions were controlled by changing the shapes of mask patterns used for forming corrugations and controlling etching conditions (time, and the number of times) in forming the corrugations. The degree of freedom of height Rh was set to exhibit the Gaussian distribution shown in FIG. 6, and a full-width at half maximum in this graph was set to be different.

In Embodiment 4, corrugations having Rh=(a) 0.3, (b) 0.2, (c) 0.1, and (d) 0 can be obtained on the surface of a reflective plate according to the above method of manufacturing a reflective plate. The reflective performance of this reflective plate is the same as that shown in FIG. 7. A coherence phenomenon disappears by setting the degree of freedom of height to 0.2 or more. A colorless reflective plate under a white light can be obtained. Note that the height distribution graph shown in FIG. 6 is not limited to the Gaussian distribution described in Embodiment 4. The height distribution graph can be changed into a trapezoid or rectangular shape by changing mask patterns. In the case of those height distribution graphs, the same effect can be obtained.

Embodiment 5:

A reflective liquid crystal display apparatus used in Embodiment 5 of the present invention had the same structure as that shown in FIG. 1. The process of forming corrugations on the surface of a reflective plate was the same as that described in Embodiment 1, provided that the pattern positions in a mask used for forming corrugations, and etching conditions were controlled so that the occupation ratio of a region having an inclination angle of 0° with respect to the horizontal surface of the insulating substrate inside the surface of the reflective pixel electrode, and the average inclination angle of all corrugations on the surface in all azimuths on the pixel electrode were controlled.

FIG. 10 shows the reflective performance of a reflective plate having different average inclination angles of corrugations formed by the above manufacturing method. According to Embodiment 5, a reflective display apparatus can obtain a display performance having a uniform brightness or more of a sheet of newspaper by setting the average inclination angle K at 5° to 10°.

When all the average inclination angles of corrugations are equal, and the occupation ratio of a flat region included in the reflective pixel electrode changes, i.e., (a) 0%, (b) 30%, and (c) 45%, different reflective properties shown in FIG. 9 can be obtained. According to this embodiment, if the occupation ratio of the flat region inside the pixel electrode is set to 20% or less, and the average inclination angle of corrugations is satisfied, a reflective plate having a strong reflectivity in the reflective performance and excellent scattering properties can be obtained. A reflective liquid crystal display apparatus can be obtained in which a panel display using the reflective plate is bright in a wide viewing range.

Embodiment 6:

A reflective liquid crystal display apparatus used in Embodiment 6 of the present invention had the same structure as that shown in FIG. 1. The process of forming corrugations on the surface of a reflective plate was the same as that described in Embodiment 1, provided that the number of corrugations to be formed inside a pixel electrode is controlled by changing the number of patterns in a mask used for forming the corrugations. Remaining corrugation conditions were the same as those for the reflective plate obtained in Embodiment 1 described above. In Embodiment 6, according to the above method of manufacturing a reflective plate, reflective plates were manufactured in which the numbers of recessed (or projecting) portions having corrugation shapes were 4 to 8, and 100 or more inside the pixel electrodes. FIG. 11 shows the properties of the reflective plate when the numbers of recessed (or projecting) portions are (a) 4, (b) 6, and (c) 8 inside the pixel electrode. In Embodiment 6, continuous, bright reflective performance free from coherence can be obtained within a wide incident angle range by setting the number of recessed (or projecting) portions to six or more. A reflective plate having good reflective performance can be obtained. Note that the same effect can be obtained under corrugation conditions except for those in this embodiment.

In the present invention, although aluminum is used as the material of the reflective plate, the same effect can be obtained even with silver as another material. In Embodiment 6, the film thickness of the aluminum layer is 0.1 to 3 $\mu$m. Alternatively, the film thickness of the material of a reflective plate may be set to as small as 0.1 $\mu$m or less, or the reflectivity may be decreased by mixing oxygen atoms. The reflective plate obtained in this manner can be applied to a semitransparent/reflective liquid crystal display apparatus.

In Embodiments 1 to 6, photolithography and etching are used as the corrugation manufacturing method, but the method is not limited to them. The same effect can be obtained by another manufacturing method, provided that the corrugation conditions of the present invention are satisfied. A reflective liquid crystal display apparatus having a high-quality display can be realized.

What is claimed is:

1. A reflective liquid crystal display apparatus comprising a liquid crystal layer sandwiched between an insulating substrate having a corrugated reflective plate as a pixel electrode and an insulating substrate having a transparent electrode, wherein said reflective plate is a reflective plate having an irregularly corrugated structure comprising plural irregular elongated ridgelines, and a value obtained by standardizing a full-width at half maximum in a distribution graph of the distances between adjacent projecting or recessed portions with an average of the distances between said adjacent projecting or recessed portions falls within a range of 0.3 to 0.9.

2. A reflective liquid crystal display apparatus comprising a liquid crystal layer sandwiched between an insulating substrate having a corrugated reflective plate as a pixel electrode and an insulating substrate having a transparent electrode, wherein said reflective plate is a reflective plate having an irregularly corrugated structure comprising plural irregular elongated ridgelines, and an average of the distances between adjacent projecting or recessed portions falls within a range of 1 $\mu$m to 80 $\mu$m.

3. A reflective liquid crystal display apparatus comprising a liquid crystal layer sandwiched between an insulating substrate having a corrugated reflective plate as a pixel electrode and an insulating substrate having a transparent electrode, wherein said reflective plate is a reflective plate having an irregularly corrugated structure comprising plural irregular elongated ridgelines, and a value obtained by standardizing a full-width at half maximum in a distribution graph of heights of projecting or recessed portions with an average of the heights falls within a range of 0.2 to 0.9.

4. A reflective liquid crystal display apparatus comprising a liquid crystal layer sandwiched between an insulating substrate having a corrugated reflective plate as a pixel electrode and an insulating substrate having a transparent electrode, wherein said reflective plate is a reflective plate having an irregularly corrugated structure comprising plural irregular elongated ridgelines, and a maximum height of corrugations on a surface of said reflective plate falls within a range of 0.1 $\mu$m to 5 $\mu$m.

5. A reflective liquid crystal display apparatus comprising:

a liquid crystal layer sandwiched between an insulating substrate having a corrugated reflective plate as a pixel electrode and another insulating substrate having a transparent electrode, wherein said reflective plate is a reflective plate comprising an irregularly corrugated structure comprising plural irregular elongated ridgelines, said reflective plate further comprising a region having a perimeter, within which perimeter said region comprises flat regions and corrugated regions, said flat regions having an inclination angle of 0° with respect to a horizontal surface of said insulating substrate inside a surface of said pixel electrode and occupying not more than 20% of an area within said perimeter of said region, and an average inclination angle of corrugations in the area within said perimeter of said region is 5° to 10° in all azimuths.

6. A reflective liquid crystal display apparatus comprising:

a liquid crystal layer sandwiched between an insulating substrate having a corrugated reflective plate as a pixel electrode and another insulating substrate having a transparent electrode, wherein said reflective plate is a reflective plate comprising an irregularly corrugated structure region comprising plural irregular elongated ridgelines and not less than six projecting or recessed portions inside said corrugated structure region, and wherein said corrugated structure region satisfies at least one of the following conditions:

(1) that a value obtained by standardizing a full-width at half maximum in a distribution graph of distances between adjacent projecting or recessed portions with an average of the distances between said adjacent projecting or recessed portions falls within a range of 0.3 to 0.9;

(2) that an average of distances between adjacent projecting or recessed portions falls within a range of 1 $\mu$m to 80 $\mu$m;

(3) that a value obtained by standardizing a full-width at half maximum in a distribution graph of heights of projecting or recessed portions with an average of the heights falls within a range of 0.2 to 0.9;

(4) that a maximum height of corrugations on a surface of said reflective plate falls within a range of 0.1 $\mu$m to 5 $\mu$m; and (5) that a total area of said reflective plate with an inclination angle of 0° with respect to a horizontal surface of said insulating substrate inside of said corrugated structure region occupies not more than 20% of said corrugated structure region, and an average inclination angle of corrugations in said corrugated structure region is 5° to 10° in all azimuths.

\* \* \* \* \*